United States Patent [19]

Mullins

[11] 3,963,212

[45] June 15, 1976

[54] TWO-WAY TEE FOR JOINING REFRIGERANT LINES

[76] Inventor: John W. Mullins, P.O. Box 20524, Oklahoma City, Okla. 73120

[22] Filed: Dec. 23, 1974

[21] Appl. No.: 535,630

[52] U.S. Cl. ............................................. 251/145
[51] Int. Cl.² .......................................... F16K 51/00
[58] Field of Search ........... 251/148, 150, 151, 152, 251/145, 146; 138/97; 137/315, 317, 319, 322, 798; 285/156; 62/292, 299

[56] References Cited
UNITED STATES PATENTS

| 425,553 | 4/1890 | Smith | 285/156 X |
|---|---|---|---|
| 1,780,242 | 11/1930 | Replogle | 62/292 X |
| 1,823,549 | 9/1931 | Kendall | 285/156 X |
| 2,765,806 | 10/1956 | Webster | 137/322 |
| 3,126,194 | 3/1964 | Franck | 251/148 |
| 3,454,035 | 7/1969 | Jespersen | 137/315 |
| 3,845,779 | 11/1974 | Greene, Jr. | 137/798 X |

*Primary Examiner*—William R. Cline
*Attorney, Agent, or Firm*—Robert K. Rhea

[57] ABSTRACT

An elongated body is provided with a transverse bore for receiving a short tube having flared ends adapted to be joined to adjacent ends of a refrigerant line. An axial threaded socket, in the adjacent end of the body communicating with the transverse bore, receives a valve core equipped valve housing for providing communication with the bore of the refrigerant line.

1 Claim, 6 Drawing Figures

TWO-WAY TEE FOR JOINING REFRIGERANT LINES

BACKGROUND OF THE INVENTION

1. Field of the Invention

The present invention relates to closed refrigerant systems and more particularly to a refrigerant line coupler providing access to refrigerant gas contained by the line.

Closed refrigerating systems are provided with small diameter tubing for conveying refrigerant gas from the compressor to the refrigerant coils and back to the compressor. Malfunctions of such refrigerating systems is sometimes a result of an insufficient charge of gas or of moisture in the gas necessitating an evacuation of the system of refrigerant gas and a recharging with refrigerant gas. This is usually accomplished by an access valve connected with the refrigerant conductor or one installed by a service man, however, it is sometimes desired to part or cut the line between the compressor and coils for completely evacuating the system of refrigeration gas and any moisture therein.

2. Description of the Prior Art

Tees for connecting refrigerant lines and having a fitting for access to the bore of the line have usually been formed from brass which requires a considerably higher temperature than copper, for example, to join the refrigerant lines thereto. Such high temperature usually results in melting the joint connecting the access fitting to the tee and a resultant leak.

This invention provides a tee-like coupling for joining the ends of a severed refrigerant line at a copper tube soldering temperature and having an opening for an access valve for quickly evacuating the system and recharging it with gas to a desired pressure.

SUMMARY OF THE INVENTION

In one embodiment, an elongated copper body is provided with transverse bores of different diameters adjacent its respective ends which are counterbored for receiving adjacent end portions of a transversely parted refrigerant line. The bores are counterbored from their respective ends for forming oppositely facing annular shoulders and maintaining the adjacent ends of the refrigerant line in spaced relation with respect to each other for communication with an axial socket which threadedly receives a valve housing containing a removable valve core.

In another embodiment, the transverse bores respectively receive short tubes each having a lateral opening communicating with the axial socket and which are flared at their respective end portions for receiving the adjacent end portions of the parted refrigerant line.

In a third embodiment, one end portion of the transverse bores respectively receives one end portion of a pair of flared tube fittings for connection with the refrigerant line ends by flare nuts. The other transverse bore of this embodiment is provided with a tube projecting beyond the body for joining refrigerant line ends and having a lateral aperture communicating with the axial socket.

The principal object of the present invention is to provide a serviceman's tee-like connector for connecting the adjacent ends of at least two different diameter refrigerant lines together, respectively, and for receiving a valve equipped valve housing for communication with the refrigerant line.

DESCRIPTION OF THE PREFERRED EMBODIMENTS

Figure 1:
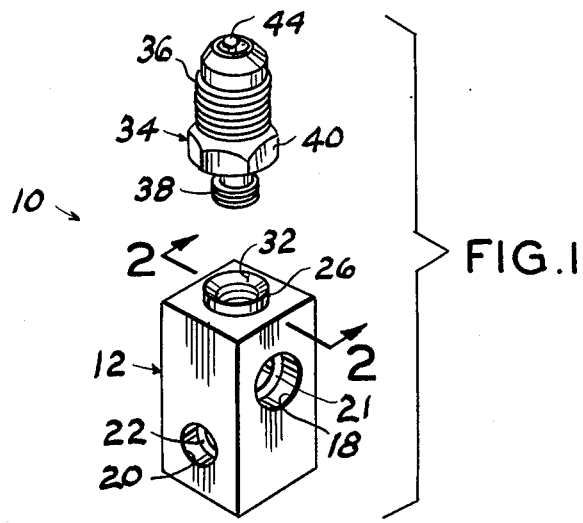
FIG. 1 is an exploded perspective view of the preferred embodiment.

Like characters of reference designate like parts in those figures of the drawings in which they occur.

The reference numeral 10 indicates the tee fitting, as a whole, comprising an elongated body 12, preferably formed of copper and having transverse bores 14 and 16 intermediate its ends arranged in 90° relationship.

Figure 2:
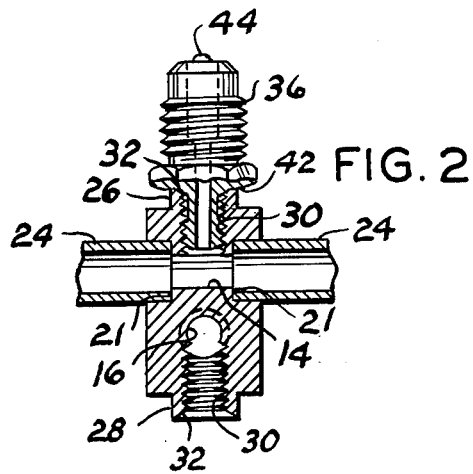
FIG. 2 is a vertical cross sectional view taken substantially along the line 2—2 of FIG. 1 illustrating the valve housing connected with the tee body.

Each of the bores are counterbored from its respective ends, as at 18 and 20, on different diameters of two most frequently used size refrigerant lines for forming oppositely facing annular shoulders 21 and 22 at the inward limit of the respective counter-bore for receiving adjacent end portions 24 of a parted refrigerant line. As shown in FIG. 2, the shoulders 21 limit the line penetration of the body to maintain the line end portions 24 in spaced-apart relation. The respective end of the body is provided with a diametrically reduced axial projection or tube-like extension 26 and 28 which are centrally drilled and threaded to form a socket 30 communicating with the respective transverse bore and characterized by a countersunk outwardly facing annular seat end surface 32.

The purpose of the diametrically reduced extensions 26 and 28 is to form a relatively thin wall area, on the end of which the seat 32 is formed, so that the body material, from which the thin wall is formed, will yield, under pressure and form a fluid tight seal as presently explained.

A cylindrical valve housing 34, having external threads 36 and 38, at its respective ends, defines a hexagonal intermediate portion 40 for engagement by a wrench, not shown. The end surface of the portion 40 facing toward the threads 38 is tapered or beveled, as at 42, for seating and sealing with the seat 32. The valve housing 34 is centrally bored and threaded for receiving a spring urged valve core 44, such as a Schrader-type core, for opening and closing the central bore of the housing. The valve housing 34 is preferably formed from metallic material, such as steel, and is threadedly engaged with the threads 30 by its threads 38 and tightened until the copper material yields sufficiently to form a fluid tight seal between the wrench flat end surface 42 and the seat 32.

Figure 3:
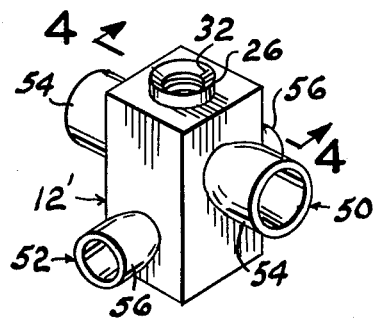
FIG. 3 is a perspective view of another embodiment of the device.
Figure 4:
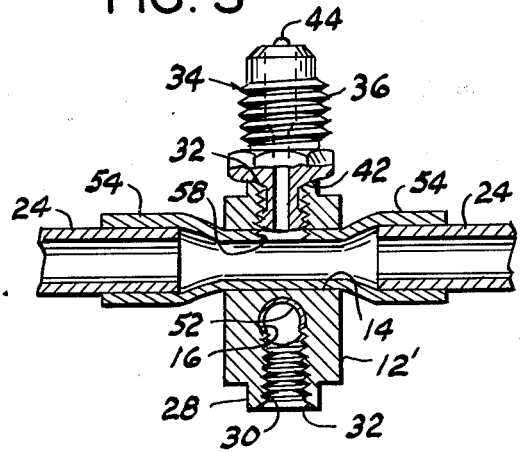
FIG. 4 is a vertical cross sectional view taken substantially along the line 4—4 of FIG. 3 and illustrating a valve core equipped housing connected therewith.

Referring to FIGS. 3 and 4, the counterbores forming the shoulders 21 and 22 in the body 12' are omitted and short lengths of tubing 50 and 52 are respectively extended through the transverse bores. Opposing ends of the tubes 50 and 52 are then externally upset, as at 54 and 56, respectively, adjacent the body 12 on predetermined diameters for impinging the tubes within the body and receiving end portions of conventional size refrigerant lines 24. The tubing 50 and 52 is each provided with a lateral aperture 58, only one being shown, communicating with the respective body end socket.

Figure 5:
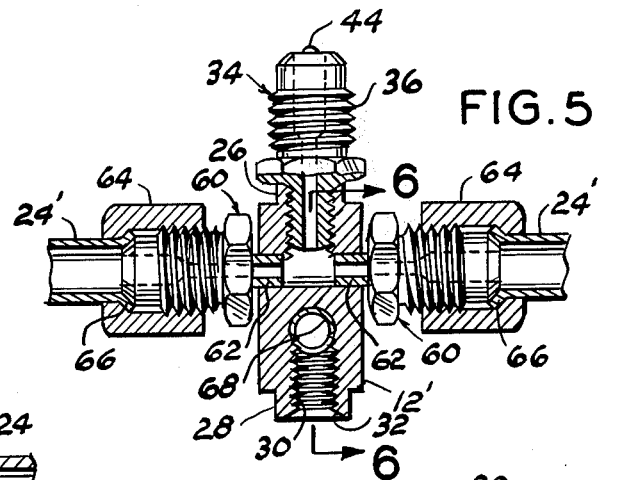
FIG. 5 is a vertical cross sectional view, partially in elevation, of another embodiment of the device for receiving flare tubing connectors; and, FIG. 6 is a fragmentary vertical cross sectional veiw taken substantially along the line 6—6 of FIG. 5.
Figure 6:
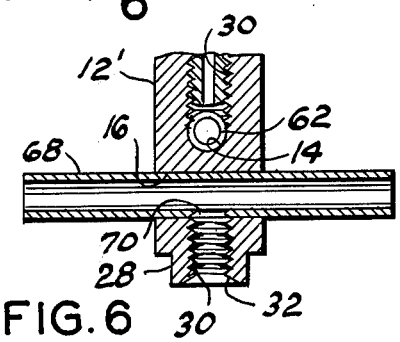

Referring now to FIGS. 5 and 6, the body 12' has one of its transverse bores fitted at its respective ends with a pair of flare nut fittings 60, each having a diametrically reduced tip end portion 62 entering and brazed to the respective end portion of the transverse bore. The respective end portions 24' of the refrigerant line may then be provided with flare nuts 64 and the end portion of the tubing 24' flared, as at 66, for sealing engagement with the respective flare nut fitting 60. The valve housing 34 is similarly connected with the body axial extension 26. In this embodiment the other transverse bore is provided with a short length of tubing 68 having an aperture 70 therein communicating with the threaded axial bore 30 formed in the axial extension 28.

Operation Of The Preferred Embodiment

In the operation of the embodiments of FIGS. 1 and 2, the refrigerant line is parted and the respective end portions 24 of the refrigerant line are inserted into the counterbores 18. If the next smaller diameter line is being used, the counterbores 20 are used. After soldering the refrigerant line end portions 24 to the body, the valve housing 34 is threadedly engaged with threaded bore 30 communicating with the refrigerant line for evacuating the system and recharging it with refrigerant gas.

Operation Of The Embodiment Of FIGS. 3 and 4

The operation of this embodiment is substantially identical to that of FIGS. 1 and 2 except that the externally upset tubing end portions 54 and 56, accommodating the refrigerant line end portions 24, are simply soldered thereto and the tee body provided with the valve fitting 34.

Operation Of The Embodiment Of FIGS. 5 and 6

In operation, the flared tubing fittings 60 are normally soldered or brazed to the tee body at the time of manufacture and the short length of tubing 68 similarly installed in the other transverse bore giving the serviceman the option of using the flared tube fittings or the short length of tubing 58 which may also be flared or externally upset in the manner shown by FIG. 3. After connecting the refrigerant line ends to the flared tube fittings or the tubing 68 the valve housing 34 is threadedly engaged with the threaded socket in the end portion of the tee body connected with the refrigerant line ends.

Obviously the invention is susceptible to changes or alterations without defeating its practicability, therefore, I do not wish to be confined to the preferred embodiment shown in the drawings and described herein.

I claim:
1. A refrigerant line tee, comprising:
an elongated body having a transverse bore;
a tube-like axial extension formed on one end portion of said body,
said extension and said one end portion of said body having a threaded bore communicating with the transverse bore and having an annular outwardly facing seat;
a tube extending through the transverse bore and sealed with said body,
said tube having a lateral aperture communicating with the threaded bore,
the respective end portions of said tube being externally upset adjacent said body; and,
a valve housing threadedly engaged within the threaded bore and having a tapered surface sealing fluid tight with said annular seat,
said valve housing having a central bore and having a depressible valve for opening and closing the central bore.

\* \* \* \* \*